United States Patent [19]

McGivern

[11] 3,997,444
[45] Dec. 14, 1976

[54] SEWAGE SETTLING TANK

[75] Inventor: Robert F. McGivern, Columbus, Ohio

[73] Assignee: Sybron Corporation, Rochester, N.Y.

[22] Filed: Mar. 15, 1976

[21] Appl. No.: 667,023

[52] U.S. Cl. .................. 210/242 R; 210/322; 210/521; 210/523
[51] Int. Cl.² ...................................... B01D 21/24
[58] Field of Search .......... 210/242 R, 242 S, 320, 210/322, 521, 522, 523, 221 M, 221 R, 83, 84

[56] References Cited

UNITED STATES PATENTS

| | | | |
|---|---|---|---|
| 3,333,704 | 8/1967 | McGivern et al. | 210/242 R |
| 3,491,023 | 1/1970 | McCormick | 210/242 S |
| 3,640,387 | 2/1972 | Conley et al. | 210/521 X |
| 3,768,648 | 10/1973 | Anderson et al. | 210/83 |

Primary Examiner—John Adee
Attorney, Agent, or Firm—Theodore B. Roessel; Roger Aceto

[57] ABSTRACT

A sewage settling tank is provided with two or more banks of tube settlers to improve the settling rate. The tube settlers are spaced above the bottom of the settling tank and upstanding from about the periphery of each bank is a baffle member which defines a clear water zone directly above each bank. The baffle is provided with an opening which extends below the water level to permit the carriage of a floating siphon system to pass into the clear water zone, the inlet of the siphon extending down to the bottom of the settling tank in order to remove the sludge immediately beneath each bank of tube settlers. The opening in the baffle is provided with an air gate to permit the passage of the floating carriage through the opening while preventing the untreated water from flowing through the opening into the clear water zone.

5 Claims, 4 Drawing Figures

SEWAGE SETTLING TANK

BACKGROUND OF THE INVENTION

The present invention relates to sewage settling tanks and in particular to a tank which employs tube settlers to increase the settling rate and a floating siphon system to improve the removal of sludge from the bottom of the settling tank.

Sewage settling tanks are well-known in the art and it is sufficient for the present merely to say that in such a tank the solids are allowed to settle to the bottom of the tank with the tank having some sort of weir arrangement to remove clarified water. It is known that the operation of settling tanks can be enhanced by employing tube settlers as described, for example, in U.S. Pat. No. 3,768,648. Where tube settlers are used it is common practice to provide a chain and flight system for removing the settled solids from the bottom of the settling tank beneath the tube settlers. In this respect, the chain and flight system uses a series of drive and idler pulleys which direct the continuous chain down into the settling tank and beneath the tube settler.

It is also known in the art to use a floating siphon system for removing sludge from the bottom of the settling tank. Such a system is illustrated for example, in my U.S. Pat. No. 3,333,704 and reference can be made to the patent for the details regarding the construction and operation of such a floating siphon system.

Heretofore, a floating siphon system for removing sludge from the bottom of the tank has not been compatible with tube settlers. This incompatibility arises because the area immediately above the tube settlers must be maintained as a clear water zone which is isolated from the other liquid in the settling tank. This isolation is accomplished by providing a baffle arrangement which upstands from about the periphery of the tube settlers to a point above the level of liquid in the settling tank. The floating siphon, on the other hand, must be free to move the whole length of the settling tank in order to permit the siphon inlet to sweep the area directly beneath the tube settlers. Accordingly, to provide the baffle arrangement with an opening to allow the floating siphon carriage to pass into and out of the water zone would likewise permit the passage of untreated water into the clear water zone.

The present invention, however, does permit the use of a floating siphon system in combination with a tube settler in a sewage settling tank while at the same time preventing the flow of untreated liquid directly into the clear water zone.

SUMMARY OF THE INVENTION

The present invention may be characterized in one aspect thereof by the provision, in combination with a sewage settling tank of that at least two banks of tube settlers, the banks being arranged side by side in a horizontal plane spaced above the bottom of the settling tank. A baffle upstanding from about the periphery of each bank to a level above the level of liquid in the tank defines a clear water zone which communicates directly with the outlet from the settling tank. In this manner the flow of water is from the settling tank inlet up through the tube settlers and into the clear water zone and from there to the clear water outlet. The upstream end of the baffle is provided with an opening which extends below the water level. An air bubble pipe extending across the lower edge of the opening is connected to an air supply line so that air bubbles issuing from the bubble pipe form a vertically moving curtain of air which extends across the full width of the opening. The velocity of this vertically moving curtain of air is greater than the velocity of liquid tending to flow through the opening so that the flow of liquid through the opening is prevented. The floating carriage which supports the siphon system is free to pass through the opening into and out of the clear water zone while flow of untreated liquid through the opening and into the clear water zone is prevented.

DESCRIPTION OF THE PREFERRED EMBODIMENTS

Figure 1:
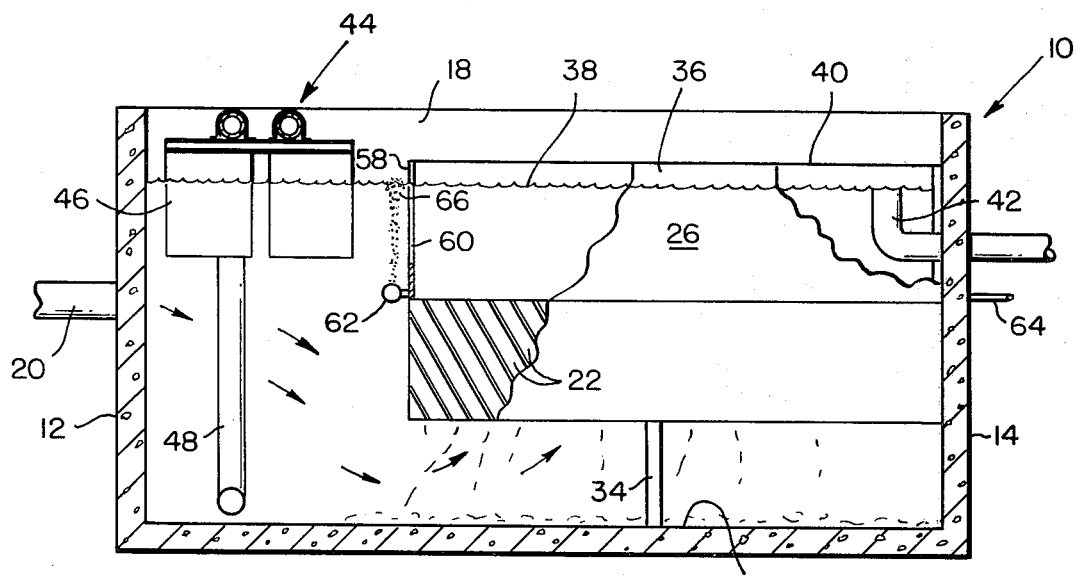
FIG. 1 is a schematic representation of a sewage settling tank taken along lines 1—1 of FIG. 2.

Referring to the drawings, FIG. 1 shows a settling tank generally indicated at 10. The tank is typical in construction having front and rear end walls 12, 14 respectively, a bottom 16 and side walls 18. Indicated at 20 is an inlet for the sewage or water to be treated. The operation of settling tanks are well known in the art and it sufficient for purposes of the present invention merely to say that sludge and solids are allowed to settle from the liquid in the tank and on to the tank bottom 16 while clarified water is removed from adjacent the top of the tank. Arranged within settling tank 20 are a series of upwardly inclined tube settlers 22. These tube settlers are arranged in a horizontal bank spaced above the bottom of the settling tank and below the level of the liquid in the tank. The operation of tube settlers and the fact that they improve the settling rate of liquid passing upwardly through the tubes also is well known in the art. Solids precipitating from the liquid travel down the tube settlers and accumulate at the bottom of the tank directly beneath the tube settlers.

Figure 2:
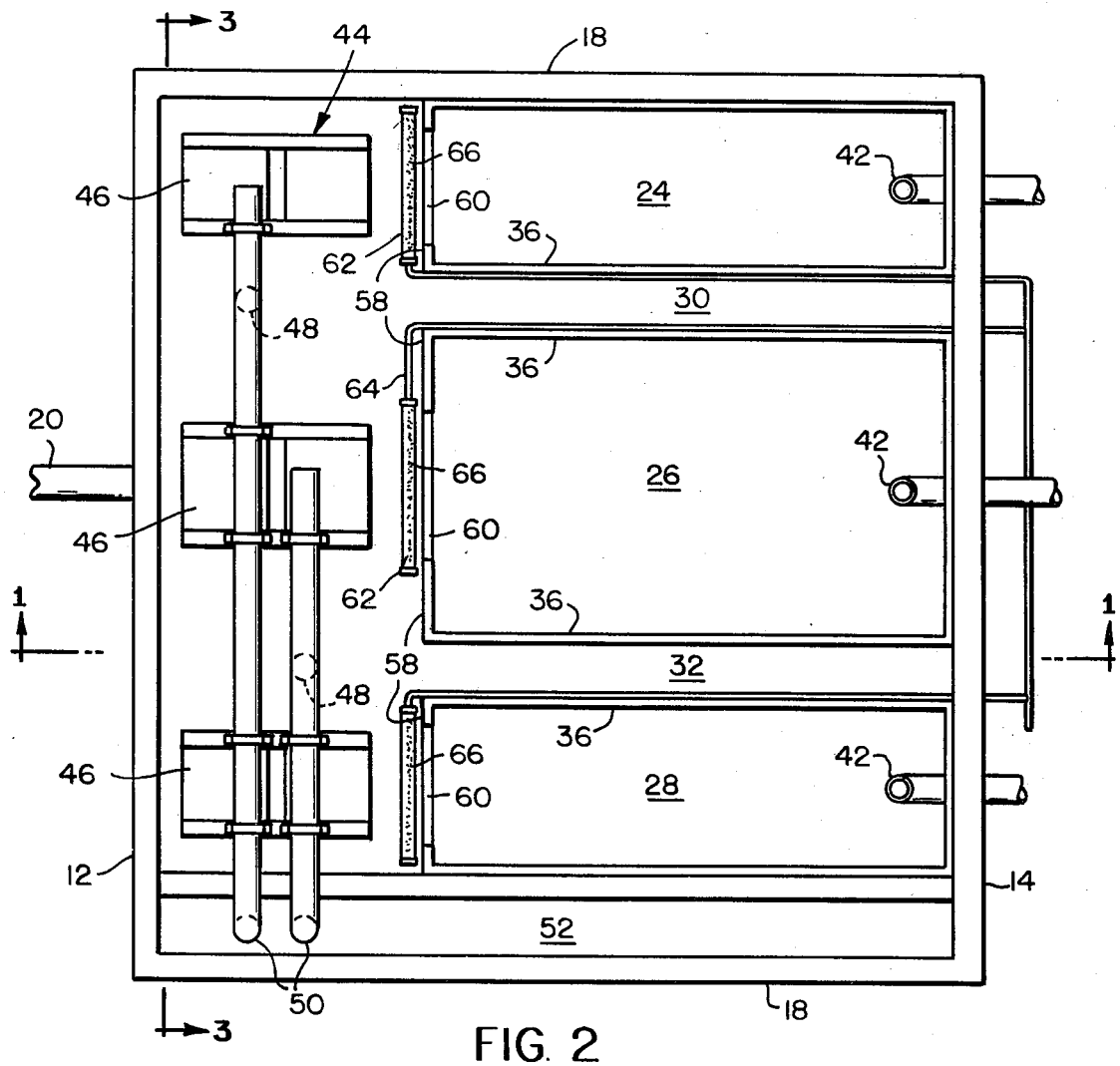
FIG. 2 is a plan view of sewage settling tank.

As shown in FIG. 2, the tube settlers are arranged three spaced banks as indicated at 24, 26 and 28. These banks are spaced apart so as to leave substantially parallel channels 30 and 32 between the banks. Any suitable means may be used to support the banks above the bottom of the settling tank, as for example, the struts 34 shown in FIG. 3.

Figure 4:
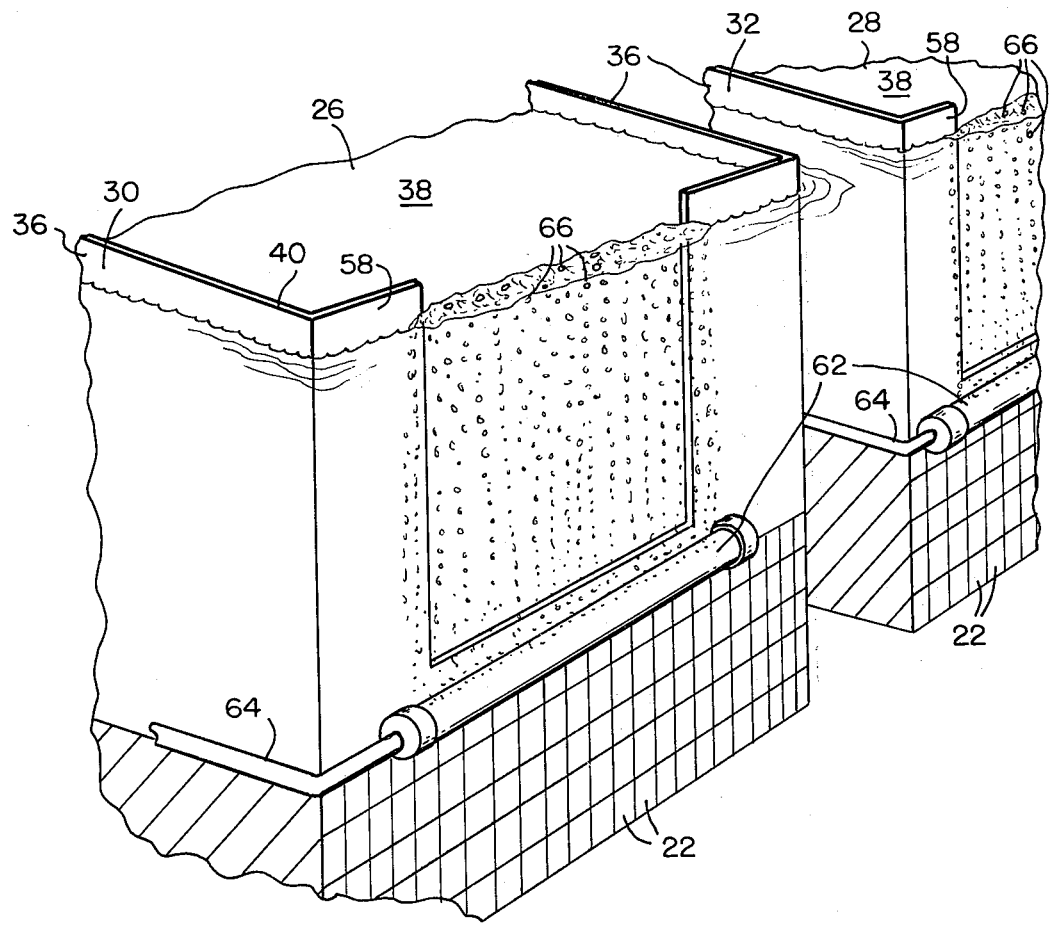
FIG. 4 is a perspective view showing the opening in a baffle as sealed according the present invention.

As shown in the figures, there is a baffle 36 upstaining from about the periphery of each bank. These baffles define clear water zones 38 directly above each bank (FIGS. 1 and 4). The upper edge 40 of each baffle extends above the level of liquid in the tank, so that the baffles as thus far described, will effectively isolate the water in the clear water zone from the untreated water or sewage in the settling tank.

FIGS. 1 and 2 show that a clear water outlet 42 is located in each clear water zone adjacent rear wall 14. This clear water outlet is preferably and overflow or weir opening and establishes the level of liquid in the settling tank.

Also disposed in the settling tank is a floating siphon system generally indicated at 44 for removing sludge from the bottom of the settling tank. Operation of such a siphon system is more particularly described in my U.S. Pat. No. 3,333,704. The system consists generally of at least two floating carriages 46. These carriages support and float the siphon back and forth across the settling tank from the front wall 12 to the rear wall 14. The siphon, itself, consists of an inlet leg 48 which extends down toward the bottom of the settling tank. In the system as described, there are two such siphons and therefore, two inlet legs 48. These legs are arranged so as to move through the channels, 30, 32 between the banks of tube settlers. The outlet leg 50 of each siphon is disposed in a sludge removal trough 52 which extends along one side of the settling tank.

Figure 3:
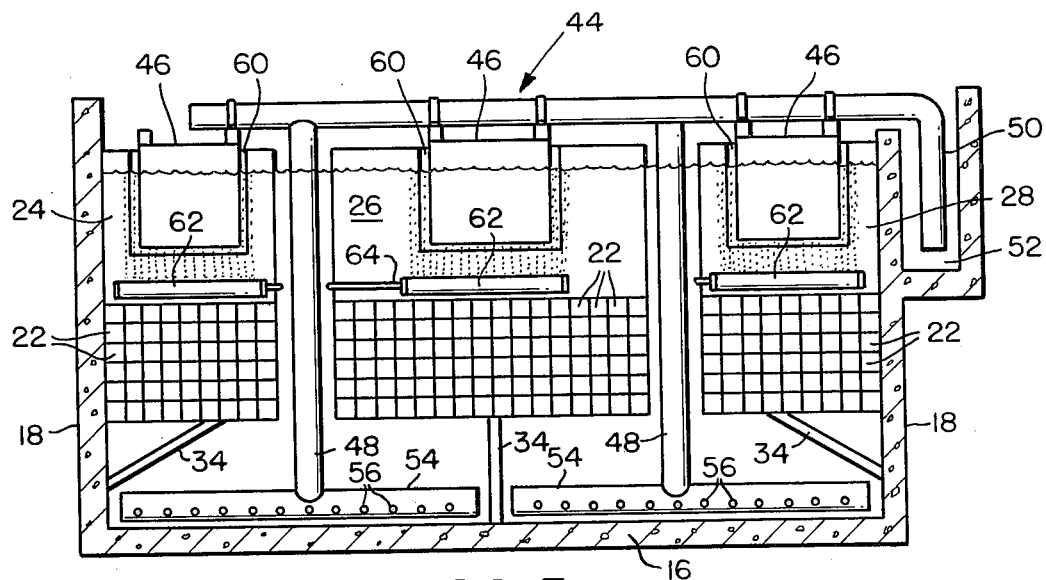
FIG. 3 is a view taken along the line 3—3 of FIG. 2.

As shown in FIG. 3, each inlet leg 48 is generally the shape of an inverted T. The horizontal branches 54 of each T are spaced close to the bottom 16 of the settling tank and extend beneath each bank of tube settlers. Each branch in addition, has a plurality of space openings 56 through which the sludge may be drawn into the inlet. Accordingly with the siphon arrangement described, the horizontal branches 54 extend substantially across the full width of the settling tank while carriages 46 carry the siphon system substantially the full length of the settling tank so that substantially the entire bottom of tank may be cleaned.

In order to permit floats 46 to travel the full length of the tank, it is necessary that the upstream end 58 of each baffle contain an opening 60 to permit the passage of the floating carriages. Such an opening which extends below the level of liquid in the settling tank would destroy the integrity of the clear water zone. In this respect, it is essential for proper operation of the settling tank that the flow of liquid be from inlet 20 up through tube settlers 22 and into the clear water zone. Having an opening 60 in the upstream end of each baffle member would permit the untreated liquid to enter the clear water zone directly from the sewage settling tank thereby contaminating the water in the clear water zone with untreated liquid flowing directly from inlet 20. To prevent this, a seal means 62 is provided to prevent flow through the baffle opening.

As shown in FIG. 4, seal means 62 is simply an air bubbler pipe which is connected through line 64 to a source of compressed air (not shown). The seal means or bubbler pipe is located just below the lower edge of opening 60 and extends the full width of the opening. Compressed air flowing through line 64 is discharged from the bubbler pipe and forms a vertically rising curtain of bubbles or air gate indicated at 66. This curtain of bubbles has a vertical velocity which is just greater than the horizontal velocity of liquid flowing through the tank. In this manner, the bubble curtain 66 prevents the flow of liquid through the opening. However, the curtain does permit the free passage through the opening of carriage 46, so that the siphon can move freely from one end of the tank to the other. Thus, the air gate established by the bubbler pipe permits the floating siphon system to be used in association with the tube settlers to improve the efficiency of sewage settling tanks. In this respect the use of tube settlers increases the settling rate of the liquid in the tank, while the floating siphon system provides a proven, simple and efficient means for removing sludge from the bottom of the settling tank. The provision of the air gate as established by bubbler pipe 62 provides an essential element permitting the associated use of the floating siphon system and tube settlers.

Having thus described the invention, what is claimed as new is:

1. A sewage settling tank comprising:
   a. a bottom and upstanding end and side walls forming a settling chamber to permit the settling of sludge on said bottom from liquid in said tank, an inlet at one end of said tank for the liquid to be treated and a clarified water outlet;
   b. at least two banks of tube settlers in said tank, said banks being arranged side by side in a horizontal plane spaced above said bottom;
   c. baffle means upstanding from about the periphery of each bank to define a clear water zone directly above each bank, said outlet communicating with said clear water zone and defining the level of liquid in said tank which is above said banks of tube settlers and below the upstanding edge of said baffle means so that the flow of liquid is from said inlet up through said tube settlers and into said clear water zone, said baffle means having an opening in the upstream side thereof which extends below the liquid level as defined by said outlet;
   d. seal means for said opening to prevent the direct flow of liquid from said inlet through said opening and into said clear water zone;
   e. a floating carriage adapted to pass through said opening and seal means; and
   f. a sludge removal siphon carried by said carriage, said siphon having its inlet leg extending over said baffle means and down between said side by side banks of tube settlers, the lower most end of said inlet leg having horizontal branches extending laterally beneath said banks to remove sludge settling said tank bottom from said tube settlers.

2. A sewage settling tank as in claim 1 wherein said seal means comprises means for directing an air stream across said opening, the velocity of said stream being sufficient to prevent the flow of liquid therethrough.

3. A sewage settling tank as in claim 1 wherein said seal means comprises means for establishing a curtain of air extending across said opening.

4. A sewage settling tank as in claim 1 wherein said seal means comprises means for establishing a vertically moving curtain of air across the full width of said opening, the velocity of said moving air curtain being sufficient to prevent the flow of liquid through said opening.

5. A sewage settling tank as in claim 1 wherein said seal means comprises:
   a. an air bubble pipe extending across said opening adjacent the lower edge thereof; and
   b. an air supply line connected to said air bubble pipe, the bubbles of air issuing from said bubble pipe establishing a vertically moving curtain of air which extends across the full width of said opening, the velocity of said vertically moving curtain of air being greater than the velocity of liquid tending to flow through said opening whereby flow of liquid through said opening is prevented.

\* \* \* \* \*